United States Patent
Chandrashekar

(10) Patent No.: US 10,405,243 B2
(45) Date of Patent: Sep. 3, 2019

(54) CONTROL AND USER PLANE DECOUPLING IN RADIO ACCESS NETWORK

(71) Applicant: NOKIA SOLUTIONS AND NETWORKS OY, Espoo (FI)

(72) Inventor: Subramanya Chandrashekar, Bangalore (IN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/758,315

(22) PCT Filed: Sep. 16, 2015

(86) PCT No.: PCT/EP2015/071204
§ 371 (c)(1),
(2) Date: Mar. 7, 2018

(87) PCT Pub. No.: WO2017/045708
PCT Pub. Date: Mar. 23, 2017

(65) Prior Publication Data
US 2018/0249381 A1  Aug. 30, 2018

(51) Int. Cl.
*H04W 36/00* (2009.01)
*H04W 74/00* (2009.01)
(Continued)

(52) U.S. Cl.
CPC ........ *H04W 36/0011* (2013.01); *H04W 36/08* (2013.01); *H04W 72/042* (2013.01); *H04W 72/0453* (2013.01); *H04W 72/1215* (2013.01); *H04W 72/1289* (2013.01); *H04W 74/006* (2013.01); *H04W 76/10* (2018.02); *H04W 84/042* (2013.01)

(58) Field of Classification Search
CPC . H04W 36/0011; H04W 36/08; H04W 36/10; H04W 76/10; H04W 84/042
See application file for complete search history.

(56) References Cited

U.S. PATENT DOCUMENTS

2006/0166687 A1 * 7/2006 Edman ............... H04W 88/06 455/502
2017/0006594 A1 * 1/2017 Wei ................... H04W 72/1242

FOREIGN PATENT DOCUMENTS

EP        2713650 A1    4/2014
WO    2013174335 A2   11/2013
(Continued)

OTHER PUBLICATIONS

International Search Report and Written Opinion for International Application No. PCT/EP2015/071204, dated May 30, 2016 (13 pages).
(Continued)

*Primary Examiner* — Mewale A Ambaye
(74) *Attorney, Agent, or Firm* — Brake Hughes Bellermann LLP

(57) ABSTRACT

There are provided measures for enabling/realizing decoupling of the control plane and the user plane in a radio access network. Such measures exemplarily comprise respective entities which are operable in a radio access network of a communication system and their respective operations, wherein a control/user plane entity provides control/user plane functionality in the radio access network for controlling control/user plane connectivity of at least one terminal to the core network of the communication system via the radio access network, and establish/provide a control/user plane connection to at least one user/control plane apparatus configured to provide user/control plane functionality in the radio access network for realizing user/control connectivity of the at least one terminal to the core network of the communication system via the radio access network.

10 Claims, 10 Drawing Sheets

(51) Int. Cl.
*H04W 72/12* (2009.01)
*H04W 72/04* (2009.01)
*H04W 76/10* (2018.01)
*H04W 36/08* (2009.01)
*H04W 84/04* (2009.01)

(56) References Cited

FOREIGN PATENT DOCUMENTS

WO  2013185683 A2  12/2013
WO  2015004922 A1  1/2015

OTHER PUBLICATIONS

CATT: "Key Technologies and Standardization for 5G Radio Access", 3GPPRAN-Workshop on 5G; RWS-150003, Phoenix, AZ, USA, Sep. 17-18, 2015 (29 pages).

Liu et al., "CONCERT: A Cloud-Based Architecture for Next-Generation Cellular Systems", IEEE Wireless Communications, Dec. 2014, pp. 14-22 (9 pages).

Yazici et al., "A New Control Plane for 5G Network Architecture with a Case Study on Unified Handoff, Mobility, and Routing Management", IEEE Communications Magazine, Nov. 2014, pp. 76-85 (10 pages).

"Deutsche Telekom & T-Mobile USA View on 5G", 3GPP RAN 5G Workshop, RSW-150033, Phoenix, AZ, USA, Sep. 17-18, 2015 (10 pages).

"Nokia Vision & Priorities for Next Generation Radio Technology", 3GPP RAN Workshop on 5G, RWS-150010, Phoenix, AZ, USA, Sep. 17-18, 2015 (17 pages).

"View on 5G Radio Technology and Standardization", 3GPP RAN Workshop on 5G, RWS-150023, Phoenix, AZ, USA, Sep. 17-18, 2015 (17 pages).

Office Action for Japanese Application No. 2018-512543, dated Jan. 30, 2019, 10 pages.

\* cited by examiner

CONTROL AND USER PLANE DECOUPLING IN RADIO ACCESS NETWORK

CROSS-REFERENCE TO RELATED APPLICATIONS

This application is a national stage entry of PCT Application No. PCT/EP2015/071204 filed Sep. 16, 2015, entitled "CONTROL AND USER PLANE DECOUPLING IN RADIO ACCESS NETWORK" which is hereby incorporated by reference in its entirety.

FIELD

The present invention relates to control and user plane decoupling in radio access network. More specifically, the present invention relates to measures (including methods, apparatuses and computer program products) for enabling/realizing decoupling of the control plane and the user plane in a radio access network.

BACKGROUND

New mobile communication systems are currently being developed, which are to succeed current mobile communication systems, such as e.g. any 3GPP communication system beginning from second to fourth generations (2G, 3G, 4G), like UMTS, LTE, LTE-A, etc. Such new mobile communication systems are typically denoted as 5G communication systems. In 5G communication systems, it is generally envisioned to enable provision of new mobile low-latency and ultra-reliable services, and to provide other services like V2X communications more efficiently.

FIG. 1 shows a schematic diagram of a 5G communication system architecture, for which the present invention is applicable.

As shown in FIG. 1 (in the horizontal direction thereof), the 5G system architecture can be logically/functionally divided in a mobile access domain, a networking services domain and an application domain. As shown in FIG. 1 (in the vertical direction thereof), the 5G system architecture can also be logically/functionally divided in a control plane (CP) and a user plane (UP). As usual, the control plane is responsible for establishing and controlling connectivity of a terminal to the communication system, i.e. handling signaling for enabling service provision, while the user plane is responsible for realizing connectivity of a terminal to the communication system, i.e. handling data/traffic for service provision. The CP is handled by cMGW (in the NAS) and AP (in the AS), and the UP is handled by uGW (in the NAS) and AP (in the AS). While cMGW configures uGW to handle the user plane issues, tunnels established between uGW and AP are to deliver user traffic securely.

In the 5G architecture shown in FIG. 1, the AP can be regarded to constitute the radio access network (RAN), while the remaining entities can be regarded to constitute the core network (CN).

Herein, the structure and operation of the mobile access domain are specifically addressed.

In the 5G architecture, a RAN (or AS) mobility problem manifests (even more prominently than in current e.g. 4G architectures). This is essentially because of the large number of small cells and the possibility of terminals to access services using two or more service flows connected to two or more UP gateways, i.e. uGWs, offering those services, like e.g. Internet service from one UP gateway, voice service from another UP gateway, V2X service (e.g. over Ethernet) from still another UP gateway, and so on. Each of these services could be run over different radios. That is, 5G communication systems facilitate not only single-connectivity by plural terminals but also multi-connectivity by any single terminal.

Multi-connectivity generally refers to maintaining multiple radio links, and basically comprises intra 5G multi-connectivity, wherein (one CP connection and) multiple UP connections are established and maintained over different radio interfaces of the same radio access technology (RAT) or system specification, such as parallel/simultaneous connections among the different radio interfaces of 5G, namely millimeter wave (mmWave), centimeter wave (cmWave) and WA (Wide Area, <6 GHz), and/or inter RAT multi-connectivity, wherein (one or more CP connections and) multiple UP connections are established and maintained over different radio access technologies (RATs) or system specifications, such as parallel/simultaneous connections by 5G, LTE and or WLAN access types, not excluding a plural connections to 5G access type besides one or more connections to at least one other access type.

Though solutions have been proposed for RAN mobility optimizations involving the CP, intra-RAT mobility events like handovers between 5G access points imply that the tunnel endpoints of the target access point have to be synchronized at the uGW during the mobility event in order to deliver user plane data seamlessly. Hence, to address the signaling issues and the number of RAN mobility events (e.g. intra-RAT mobility events), a logical entity called multicontroller is proposed in the 5G architecture. Such multicontroller acts as an aggregation node for multi-connectivity anchoring and management, i.e. an aggregator for 5G small cells and an anchor for multi-connectivity in 5G. A multicontroller serves to aggregate the S1*-C and S1*-U connections, thereby providing an abstraction layer for RAN (or AS) mobility with respect to the core network. Herein, the star (*) mark denotes an association to 5G systems. For example, S1 may denote S1 connection in LTE-A, whereas S1* denotes S1 connection in 5G.

FIG. 2 shows a schematic diagram of a multicontroller arrangement in a 5G communication system architecture, for which the present invention is applicable.

As shown in FIG. 2, a terminal (UE) is assumed to access two services from two different uGWs, while the terminal (UE) has single-connectivity to one AP at a time. Hence, the terminal (UE) has two service flows coming from uGW1 and uGW2, wherein e.g. uGW1 could offer Internet over IP access and uGW2 could offer V2X services over Ethernet. A multicontroller—considered as a RAN logical entity—aggregates/anchors CP and UP connections (and thus handles CP and UP issues, including e.g. UE context) for these two services. The CP connections (or their handling) are terminated by the RRC block in the multicontroller, while the UP connections (or their handling) are terminated by the NCS block in the multicontroller. The multicontroller in essence manages multiple radio interfaces (i.e. cmWave, mmWave, WA) and multiple APs of each radio interface.

In case of terminal mobility in the form of a handover between two APs served by different multicontrollers, as indicated by the rightward arrow in FIG. 2, all of the CP and UP connections (and associated CP and UP issues, including e.g. UE context) for both services are to be moved/reconfigured between the new multicontroller and the new AP, even though such handover would actually only affect one of the services. This is essentially because a multicontroller represents an entity with cohesive or collocated CP and UP functionality.

For example, when considering local breakout like in LTE (when the uGW is directly tunneling the data to the AP), a mobility event where the UE moves from the coverage of AP1 to coverage of AP2 (even when there is no change in the multicontroller serving AP2), there needs to be a signaling communication towards the correct uGW to inform the change in tunnel endpoint that it is transacting with AP2 representing the target AP. This has to happen via cMGW, since there is no direct interface (or signaling connection) to communicate between AP/multicontroller and uGW directly. This involves additional signaling and is not optimal, considering the number of small cells and the associated mobility events in 5G systems. The signaling to inform the UP gateway, i.e. uGW, about the change in the tunnel endpoint identifier is a longer procedure and always has to go through the cMGW.

Accordingly, a cohesive or collocated CP and UP functionality (in the multicontroller) means that any RAN mobility event resulting in the change of the serving multicontroller (i.e. handover to a target AP connected to a different multicontroller than the source AP) will imply the following:

- All the service flows of the terminal need to be reconfigured to the new target multicontroller (aggregation node), irrespective of the need for reconfiguration of any respective service flow. That is, user mobility resulting in reconfiguration of one of multiple service flows causes that all of the multiple service flows (UP connections) as well as associated RRC signaling (CP connections) is also impacted.
- This will also pose challenges to the dimensioning topology of multicontrollers (aggregation nodes), since the aggregation will be defined by the cohesive/collocated CP&UP unit and not the individual CP and UP parts.
- Additional NAS signaling towards the CN is required to actuate RAN mobility, thereby polluting the NAS/CN with signaling overhead. This will involve the cMGW to update the associated uGW about the tunnel endpoint identifier (TEID) of the target AP.

So, with the conventional 5G architecture, even with an aggregation node such as a multicontroller with cohesive or collocated CP and UP functionality, there is no optimized abstraction of RAN (or AS) mobility from the core network.

Accordingly, there is a demand for optimizing RAN (or AS) mobility in the network, especially in a communication system enabling multi-connectivity, in terms of the above-outlined considerations.

SUMMARY

Various exemplifying embodiments of the present invention aim at addressing at least part of the above issues and/or problems and drawbacks.

Various aspects of exemplifying embodiments of the present invention are set out in the appended claims.

According to an example aspect of the present invention, there is provided an apparatus (which is preferably operable in a radio access network of a communication system), comprising an interface; and at least one processor and at least one memory including a computer program code, wherein the at least one memory and the computer program code are configured, with the at least one processor, to cause the apparatus to perform at least the following: provide control plane functionality in the radio access network for controlling control plane connectivity of at least one terminal to a core network of the communication system via the radio access network, and establish, via the interface, a control plane connection to at least one user plane apparatus operable in the radio access network, each user plane apparatus being configured to provide user plane functionality in the radio access network for realizing user plane connectivity of the at least one terminal to the core network of the communication system via the radio access network.

According to an example aspect of the present invention, there is provided an apparatus (which is preferably operable in a radio access network of a communication system), comprising an interface; and at least one processor and at least one memory including a computer program code, wherein the at least one memory and the computer program code are configured, with the at least one processor, to cause the apparatus to perform at least the following: provide user plane functionality in the radio access network for realizing user plane connectivity of at least one terminal to a core network of the communication system via the radio access network, and provide, via the interface, a control plane connection to at least one control plane apparatus operable in the radio access network, each control plane apparatus being configured to provide control plane functionality in the radio access network for controlling control plane connectivity of the at least one terminal to the core network of the communication system via the radio access network.

According to an example aspect of the present invention, there is provided an apparatus (which is preferably operable in a radio access network of a communication system), comprising means for providing control plane functionality in the radio access network for controlling control plane connectivity of at least one terminal to a core network of the communication system via the radio access network, and means for establishing a control plane connection to at least one user plane apparatus operable in the radio access network, each user plane apparatus being configured to provide user plane functionality in the radio access network for realizing user plane connectivity of the at least one terminal to the core network of the communication system via the radio access network.

According to an example aspect of the present invention, there is provided an apparatus (which is preferably operable in a radio access network of a communication system), comprising means for providing user plane functionality in the radio access network for realizing user plane connectivity of at least one terminal to a core network of the communication system via the radio access network, and means for providing a control plane connection to at least one control plane apparatus operable in the radio access network, each control plane apparatus being configured to provide control plane functionality in the radio access network for controlling control plane connectivity of the at least one terminal to the core network of the communication system via the radio access network.

According to an example aspect of the present invention, there is provided a method (which is preferably operable in a radio access network of a communication system), comprising providing control plane functionality in the radio access network for controlling control plane connectivity of at least one terminal to a core network of the communication system via the radio access network, and establishing a control plane connection to at least one user plane apparatus operable in the radio access network, each user plane apparatus being configured to provide user plane functionality in the radio access network for realizing user plane connectivity of the at least one terminal to the core network of the communication system via the radio access network.

According to an example aspect of the present invention, there is provided a method (which is preferably operable in a radio access network of a communication system), comprising providing user plane functionality in the radio access network for realizing user plane connectivity of at least one terminal to a core network of the communication system via the radio access network, and providing a control plane connection to at least one control plane apparatus operable in the radio access network, each control plane apparatus being configured to provide control plane functionality in the radio access network for controlling control plane connectivity of the at least one terminal to the core network of the communication system via the radio access network.

According to an example aspect of the present invention, there is provided a computer program product comprising a (computer-executable) computer program code which, when the program code is executed (or run) on a computer or the program is run on a computer (e.g. a computer of an apparatus according to any one of the aforementioned apparatus-related example aspects of the present invention), is configured to cause the computer to carry out the method according to any one of the aforementioned method-related example aspects of the present invention.

The computer program product may comprise or may be embodied as a (tangible/non-transitory) computer-readable (storage) medium or the like, on which the (computer-executable) computer program code is stored, and/or the program is directly loadable into an internal memory of the computer or a processor thereof.

Further developments and/or modifications of the aforementioned exemplary aspects of the present invention are set out in the following.

By way of exemplifying embodiments of the present invention, decoupling of the control plane and the user plane in a radio access network can be enabled/realized. Thereby, RAN (or AS) mobility in the network can be optimized, especially in a communication system enabling multi-connectivity, in terms of the above-outlined considerations. Particularly, service-specific mobility can be enabled thereby, for example.

BRIEF DESCRIPTION OF THE DRAWINGS

In the following, the present invention will be described in greater detail by way of non-limiting examples with reference to the accompanying drawings, in which.

DETAILED DESCRIPTION

Figure 1:
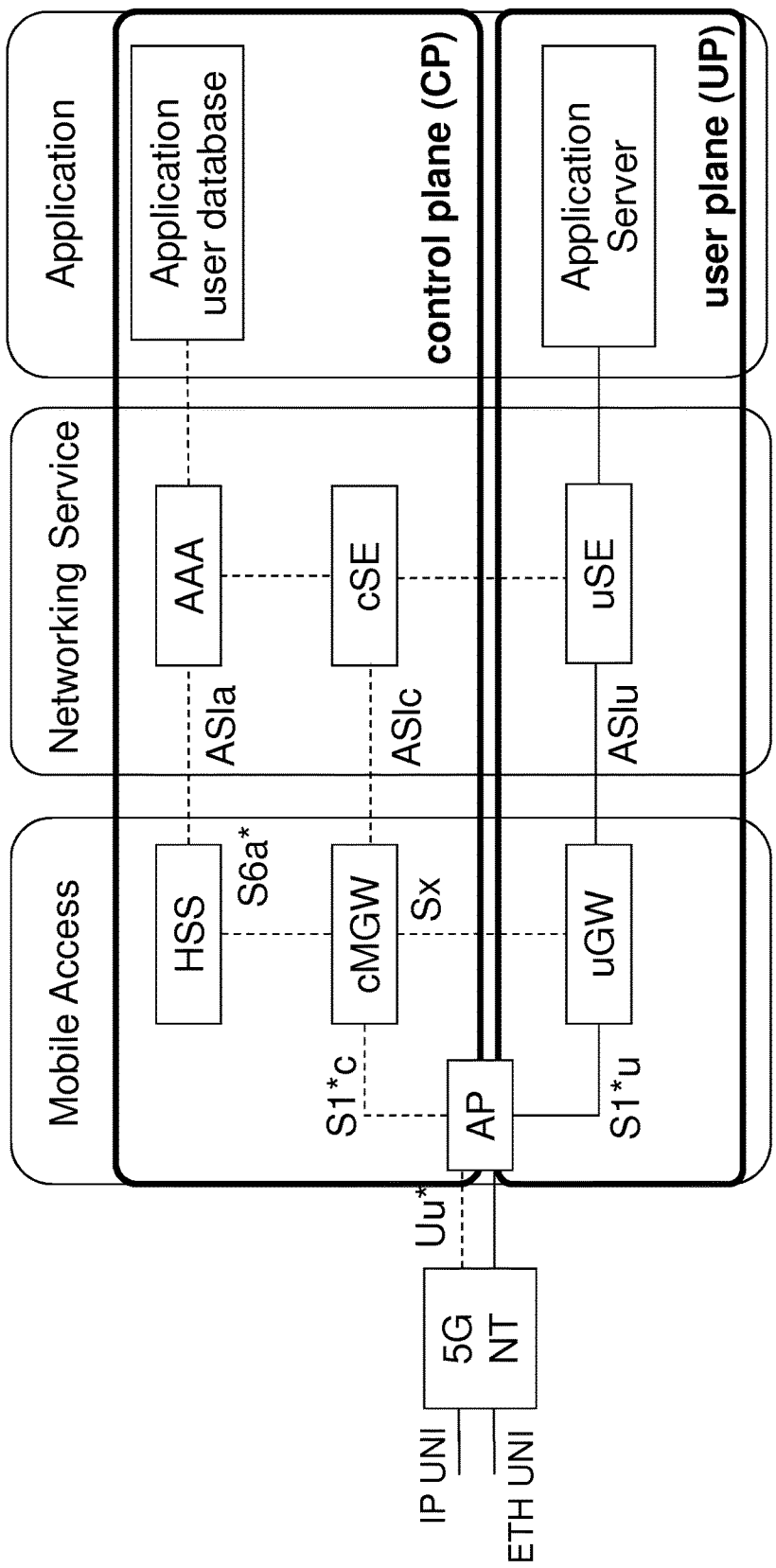
FIG. 1 shows a schematic diagram of a 5G communication system architecture, for which the present invention is applicable.
Figure 2:
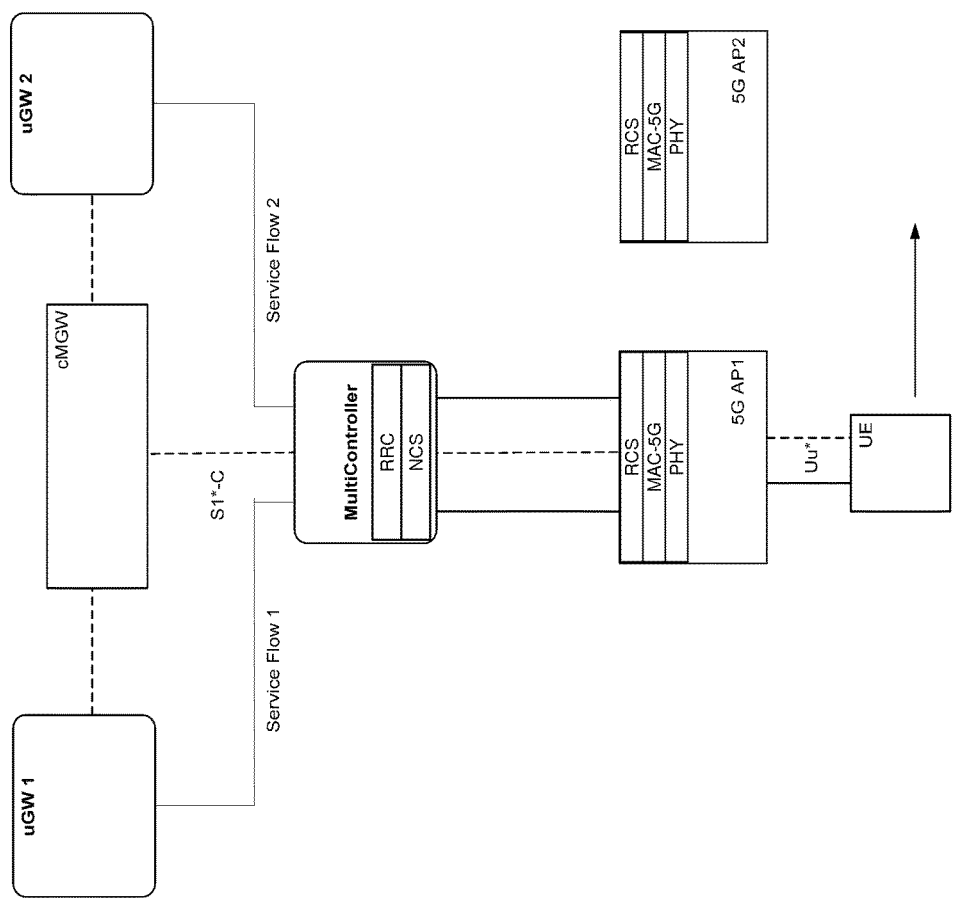
FIG. 2 shows a schematic diagram of a multicontroller arrangement in a 5G communication system architecture, for which the present invention is applicable.

The present invention is described herein with reference to particular non-limiting examples and to what are presently considered to be conceivable embodiments of the present invention. A person skilled in the art will appreciate that the present invention is by no means limited to these examples and embodiments, and may be more broadly applied.

It is to be noted that the following description of the present invention and its embodiments mainly refers to specifications being used as non-limiting examples for certain exemplifying network configurations and system deployments. Namely, the present invention and its embodiments are mainly described in relation to specifications of a 5G communication system being used as non-limiting examples. As such, the description of exemplifying embodiments given herein specifically refers to terminology which is directly related thereto. Such terminology is only used in the context of the presented non-limiting examples and embodiments, and does naturally not limit the invention in any way. Rather, any other system configuration or deployment may equally be utilized as long as complying with what is described herein and/or exemplifying embodiments described herein are applicable to it.

Hereinafter, various exemplifying embodiments and implementations of the present invention and its aspects are described using several variants and/or alternatives. It is generally to be noted that, according to certain needs and constraints, all of the described variants and/or alternatives may be provided alone or in any conceivable combination (also including combinations of individual features of the various variants and/or alternatives). In this description, the words "comprising" and "including" should be understood as not limiting the described exemplifying embodiments and implementations to consist of only those features that have been mentioned, and such exemplifying embodiments and implementations may also contain features, structures, units, modules etc. that have not been specifically mentioned.

In the drawings, it is to be noted that lines/arrows interconnecting individual blocks or entities are generally meant to illustrate an operational connection there-between, which may be a physical and/or logical connection, which on the one hand is implementation-independent (e.g. wired or wireless) and on the other hand may also comprise an arbitrary number of intermediary functional blocks or entities not shown.

According to exemplifying embodiments of the present invention, in general terms, there are provided measures and mechanisms for enabling/realizing decoupling of the control plane and the user plane in a radio access network.

Figure 3:
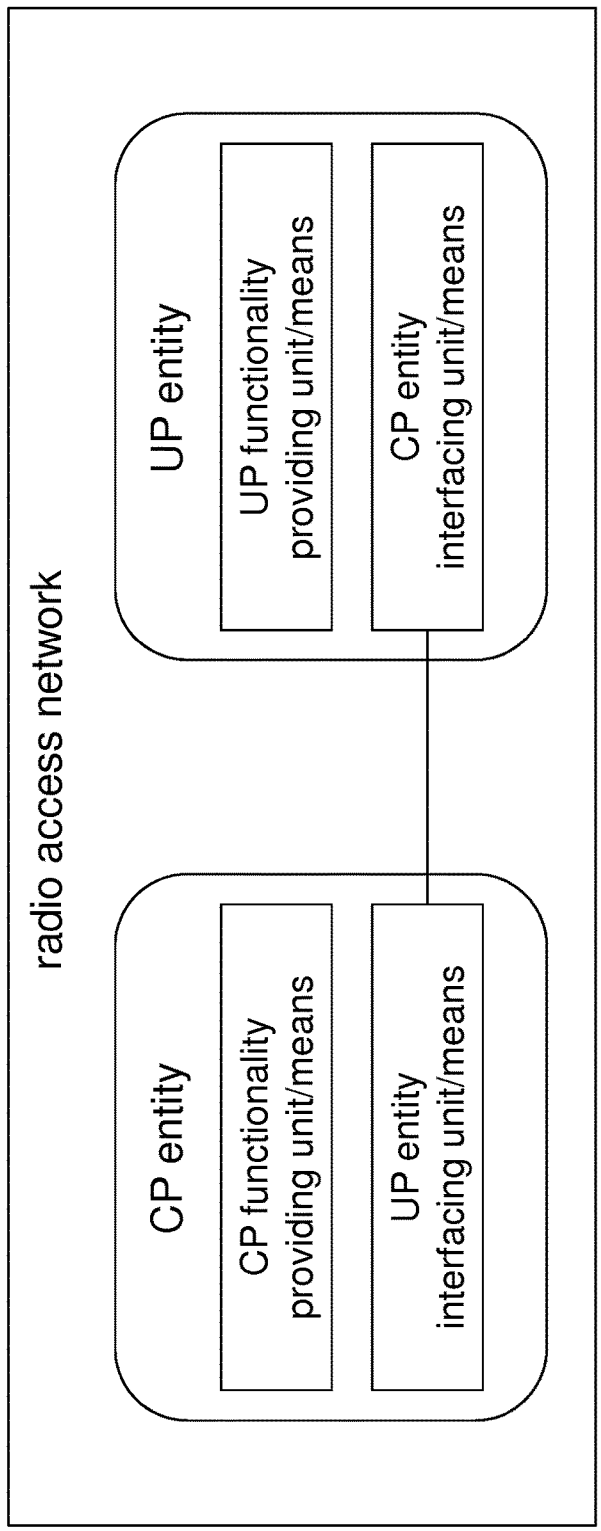
FIG. 3 shows a schematic diagram illustrating an example of an arrangement of a CP entity and a UP entity according to exemplifying embodiments of the present invention.

FIG. 3 shows a schematic diagram illustrating an example of an arrangement of a CP entity and a UP entity according to exemplifying embodiments of the present invention.

As shown in FIG. 3, a radio access network of a communication system, such as a 5G communication system, comprises a CP entity and a UP entity which are connected by way of an interface there-between.

The CP entity represents an apparatus operable in a radio access network, like a RAN apparatus or logical entity, which is configured to provide CP functionality in the radio access network for controlling CP (single- or multi-) connectivity of at least one terminal to a core network of the communication system via the radio access network (wherein providing CP functionally basically comprises handling of signaling connections and/or performing control operations for service provision), and to establish a CP connection to the UP entity, i.e. (at least one) UP apparatus configured to provide UP functionality in the radio access network for realizing UP (single- or multi-)connectivity of the at least one terminal to the core network of the communication system via the radio access network. To this end, corresponding units/means can be provided in the CP entity, and/or the CP functionality can be provided by a processor and the interface connection can be established by an interface.

The UP entity represents an apparatus operable in a radio access network, like a RAN apparatus or logical entity, which is configured to provide UP functionality in the radio access network for realizing UP (single- or multi-) connectivity of at least one terminal to a core network of the communication system via the radio access network (wherein providing UP functionally basically comprises handling of data connections and/or performing traffic operations for service provision), and to provide a CP interface connection to the CP entity, i.e. at least one CP apparatus configured to provide CP functionality in the radio access network for controlling CP (single- or multi-)connectivity of the at least one terminal to the core network of the communication system via the radio access network. To this end, corresponding units/means can be provided in the UP entity, and/or the UP functionality can be provided by a processor and the interface connection can be established by an interface.

It is to be noted (that it could be understood) that the CP entity, by/in providing CP functionality, is configured to control or actually controls the CP connectivity of the at least one terminal to the core network, and that the UP entity, by/in providing UP functionality, is configured to realize or actually realizes the UP connectivity of the at least one terminal to the core network.

It is to be noted that the functional layer between the user equipment and the core network, transparently via the radio access network, basically comprises Non-Access Stratum (NAS), and the functional layer between the user equipment and the radio access network constitutes the Access Stratum (AS).

According to exemplifying embodiments of the present invention, control plane and user plane are decoupled and hosted in dedicated apparatuses or logical entities, which may be conceived to be located in or associated with the (e.g. 5G) radio access network. Certain examples of logical entities of a 5G RAN, which can host these aggregated C and U plane entities, may include RAN cloud, macro base station, small cell base station, local gateway, or the like. More specifically, the CP functionality and the UP functionality can be decoupled by a separation into distinct/dedicated apparatuses or logical entities in the radio access network and an interface there-between. Also, the CP and UP entities can be configured to aggregate one or more CP and UP connections for single-connectivity of plural terminals and/or multi-connectivity of at least one terminal, e.g. by being implemented by an aggregation node for connectivity anchoring and management/provision in the CP and UP for plural access points, respectively. That is, a CP entity or multicontroller (aggregation point) is able to manage control plane connectivity towards the core network with respect to a plurality of access points, while a UP entity or multicontroller (aggregation point) is able to provide user plane connectivity towards the core network with respect to a plurality of access points.

According to exemplifying embodiments of the present invention, the CP and UP entities and their arrangement, as illustrated in FIG. 3, can be implemented in a 5G communication system. In such context, any one of the CP and UP entities can be implemented by a respective multicontroller, as exemplarily illustrated in FIGS. 4 and 5.

Figure 4:
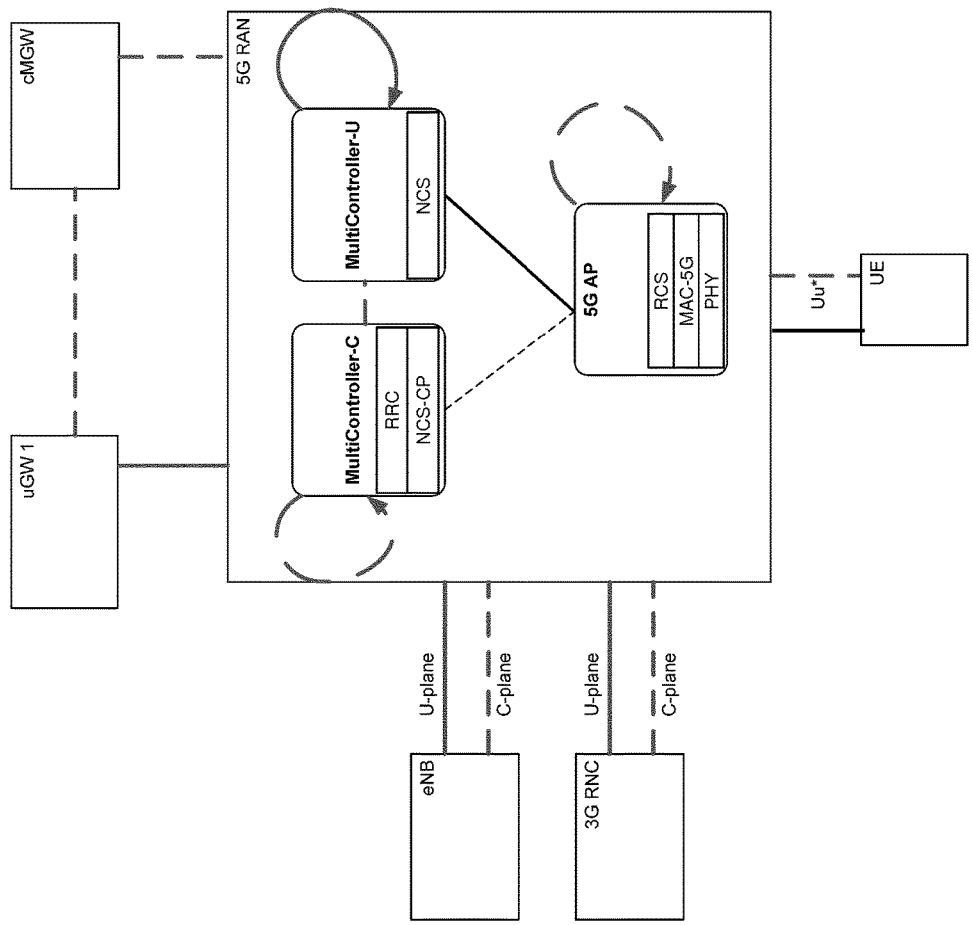
FIG. 4 shows a schematic diagram illustrating an example of an arrangement of a CP multicontroller and a UP multicontroller in a 5G communication system architecture according to exemplifying embodiments of the present invention.

FIG. 4 shows a schematic diagram illustrating an example of an arrangement of a CP multicontroller and a UP multicontroller in a 5G communication system architecture according to exemplifying embodiments of the present invention. Generally, any CP interfaces between respective apparatuses or entities are depicted by dashed lines, while any UP interfaces between respective apparatuses or entities are depicted by solid lines.

As shown in FIG. 4, a 5G RAN according to exemplifying embodiments of the present invention can comprise a (at least one) CP multicontroller (denoted as Multicontroller-C or MC-C), a (at least one) UP multicontroller (denoted as Multicontroller-U or MC-U) and a (at least one) access point (denoted as 5G AP).

The 5G RAN as such has UP and CP connections or connection interfaces to any terminal (UE), as well as a UP connection or connection interface to any uGW representing a UP gateway and a CP connection or connection interface to any cMGW representing a CP gateway. Also, the 5G RAN may have UP/CP connections or connection interfaces to any eNB representing a 4G RAN level and/or a 3G RNC representing a 3G RAN level. For details in this regard, reference is made to FIGS. 5 and 7 in which examples of certain endpoints of such interfaces or interface connections at respective apparatuses or entities are illustrated.

The MC-C can be regarded as a master and/or anchor for control plane multi-connectivity. It can be constructed as illustrated in any one of FIGS. 3, 9 and 10, and has CP interfaces or CP interface connections to a (at least one) other MC-C, a (at least one) MC-U and a (at least one) 5G AP. The MC-U can be regarded as an anchor for user plane multi-connectivity. It can be constructed as illustrated in any one of FIGS. 3, 9 and 10, and has CP interfaces or CP interface connections to a (at least one) MC-C, as well as a UP interface or UP interface connection to a (at least one) other MC-U and a 5G AP. The 5G AP can be regarded as a slave for control and user plane multi-connectivity. It has CP interfaces or CP interface connections to a (at least one) other 5G AP (optional) and any MC-C, as well as a UP interface or UP interface connection to any MC-U. As described in further detail below, the MC-U can be located/hosted alone or together with a local uGW (wherein, in the latter case, a clear separation is to be ensured between RAN and core network functionalities of/in such combined MC-U/uGW).

In an embodiment, any MC-C is configured to execute one or more network-side functions of radio resource control and/or network convergence sub-layer functions on the control plane for the (at least one) terminal. Hence, a RRC block and a NCS-CP block are depicted to be included in the MC-C. Specifically, the block denoted by NCS-CP indicates that the NCS protocol (enhanced PDCP) for control plane signaling which offers security over the radio interface can be instantiated together with the RRC protocol in any MC-C, thus ensuring that the CP/UP decoupling does not introduce any additional signaling between MC-C and MC-U or overhead.

For example, any MC-C can perform one or more of the following functions (in terms of providing CP functionality).

(i) RAN functions related to CN session and mobility management:
   Termination of S1*-C interface from cMGW (or evolved core cloud). Possibly also termination of S1-MME in some interworking solutions between LTE and 5G.
   Routing of 5G NAS protocol to the cMGW and S1*-AP protocol.

(ii) Functions related to RAN operability:
   Centralized RRM for multiple radio interfaces and RATs (5G, LTE, WLAN, etc.), e.g. including one or more of
      Load balancing, traffic steering, interference mitigation.
      Admission control, Access Stratum mobility control, Connection control (setup and re-configuration of service flows).
   Termination of RRC protocol on the network side.
   Execution of RRC-related functionality.
   Control of multi-connectivity, e.g. including one or more of
      CP signaling over multiple radios.
      Control of service flow routing over multiple radio interfaces.
      Automatic Neighbor relations (ANR) for intra-5G and inter-RAT mobility.

In an embodiment, any MC-U is configured to execute one or more network-side functions of network convergence sub-layer functions for the (at least one) terminal. Hence, a NCS block is depicted to be included in the MC-U.

For example, any MC-U can perform one or more of the following functions (in terms of providing UP functionality).
   Termination of S1*-U from uGW (or evolved core cloud).
   GTP/GRE protocol (tunneling protocol) implementation towards peer entities.
   Termination of NCS protocol.
   Flow control towards 5G AP/eNB or WLAN AP.
   Management of UP connections to different radio interfaces or RATs.
   Packet numbering and segregation for service flows and sub-service flows in DL and aggregation/re-ordering in UL.
   Packet forwarding during mobility events (unsent packets).

Any 5G AP is configured to execute one or more terminal-side functions of radio link control, medium access control and physical layer operability. Hence, a RCS block, a MAC-5G block and a PHY block are depicted to be included in the 5G AP.

According to exemplifying embodiments of the present invention, the interface connection between CP and UP entities (e.g. between MC-C and MC-U (or uGW)) can be used e.g. for the following purposes:

Configuration of user plane multi-connectivity towards different MC-Us offering different services or handling different service flows.
   Signaling multi-connectivity QoS parameters, inter-RAT parameters, or the like, based on which (sub-)services or (sub-)service flows can be segregated.
   Performing mobility-related updates, e.g. signaling of tunnel endpoint identifiers (TEIDs) to maintain access/connection during mobility.

Figure 5:
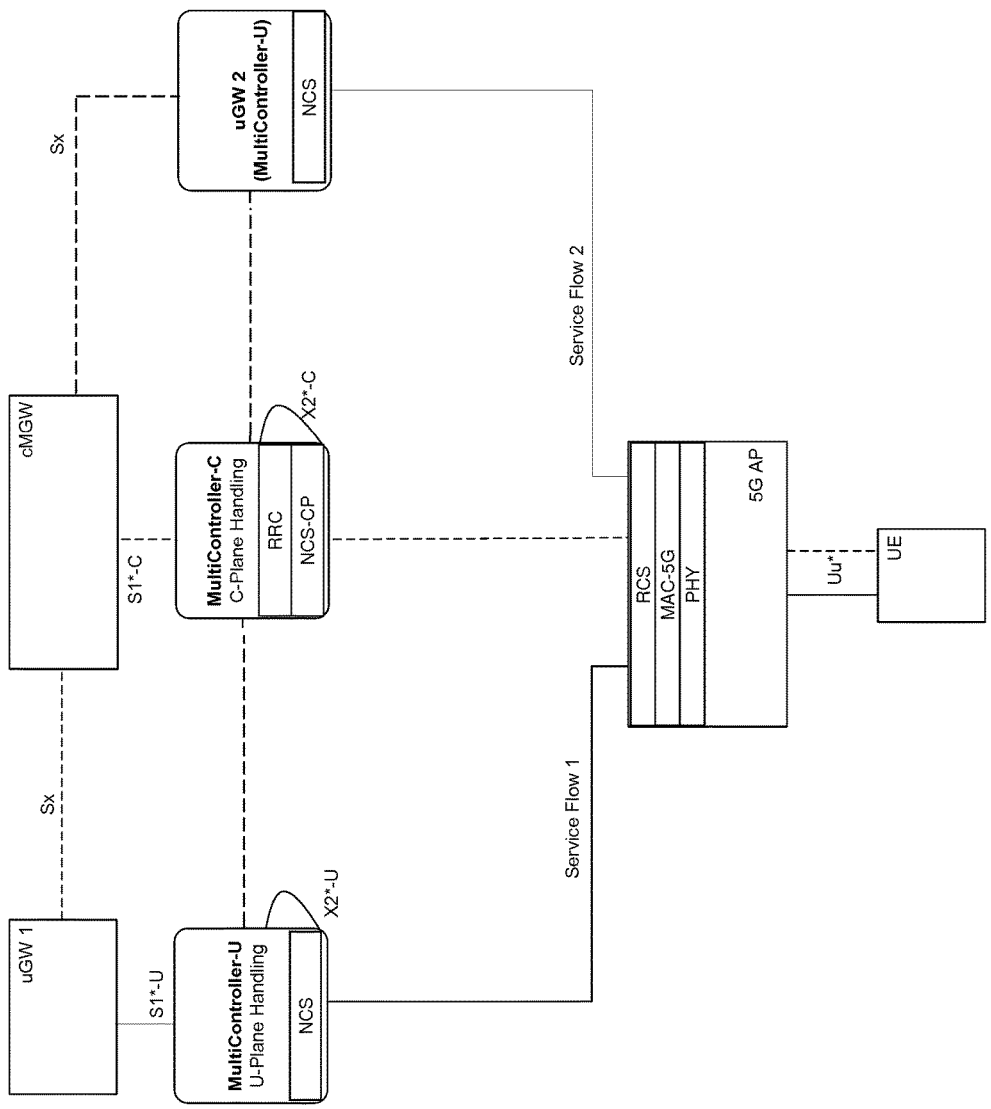
FIG. 5 shows a schematic diagram illustrating another example of an arrangement of a CP multicontroller and two UP multicontrollers in a 5G communication system architecture according to exemplifying embodiments of the present invention.

FIG. 5 shows a schematic diagram illustrating another example of an arrangement of a CP multicontroller and two UP multicontrollers in a 5G communication system architecture according to exemplifying embodiments of the present invention. Generally, any CP interfaces between respective apparatuses or entities are depicted by dashed lines, while any UP interfaces between respective apparatuses or entities are depicted by solid lines.

In FIG. 5, MC-C may represent an aggregation node capable of aggregating one or more CP connections for multi-connectivity of at least one terminal, which are established via at least two access points of the communication system. Similarly, any MC-U may represent an aggregation node capable of aggregating one or more UP connections for multi-connectivity of at least one terminal, which are established via at least two access points of the communication system. As indicated above, the MC-C can manage CP connectivity towards the core network for plural APs, irrespective of the UE or its multi-connectivity, which means that the MC-C acts as an aggregation node at the RAN side, e.g. terminating RRC and S1*-C connections for UEs served in/by plural APs. Similar notions equally apply for the MC-Us as well.

Accordingly, it could be said that
   a CP entity can be configured to provide CP functionality in the RAN at least by managing/controlling CP connectivity of at least one terminal to a core network of the communication system via the RAN and/or by managing/controlling CP connectivity towards the core network with respect to a plurality of access points, and/or
   a UP entity can be configured to provide UP functionality in the RAN at least by realizing UP connectivity of at least one terminal to the core network of the communication system via the RAN and/or by providing UP connectivity towards the core network with respect to a plurality of access points.

As shown in FIG. 5, the MC-C can establish a first CP signaling connection to at least one terminal through at least one access point (5G AP) configured to provide the at least one terminal with an access to the RAN and/or a second control plane signaling connection to at least one CP gateway (cMGW) configured to provide a control plane gateway functionality to the core network of the communication system. Any one of the MC-Us can provide a first part of a UP connection to at least one UP gateway (uGW) or service entity (such as uSE in FIG. 1) in the core network of the communication system and a second part of the (i.e. a same) user plane connection to at least one access point (5G AP) configured to provide the at least one terminal with an access to the RAN. The user plane gateway (uGW) is configured to provide a UP gateway functionality to the core network of the communication system. The service entity is configured to provide a service functionality in the core network of the communication system.

As shown in FIG. 5, a terminal (UE) is assumed to access two services from two different uGWs, while the terminal (UE) has single-connectivity to one AP at a time. Hence, the terminal (UE) has two service flows coming from uGW1 and uGW2, wherein e.g. uGW1 could offer Internet over IP access and uGW2 could offer V2X services over Ethernet. The multicontroller functionality is split into a CP multicontroller (which may be configured as described in connection with any one of FIGS. 3 and 4) for handling the control plane with regard to the service provisioning of the two services to the terminal, and two UP multicontrollers (which may be configured as described in connection with any one of FIGS. 3 and 4) for handling the user plane with regard to the service provisioning of a respective one of the two services to the terminal. That is, the UP multicontrollers are configured to be service-specific such that each service is UP-handled by a respective UP entity (while more than one service flow of a respective service may be UP-handled by a respective UP entity at a time). Thereby, the deployment of MC-Us can be adjusted depending on the types of services or service flows, latency requirements of certain services or service flows, or the like.

Accordingly, the CP multicontroller is able to manage terminal mobility in a service-specific manner, and/or to manage terminal mobility in the user plane independently from terminal mobility in the control plane. Such abilities of the CP multicontroller are effective, e.g. when one service flow (e.g. V2X) requires a handover, whereas another service flow (e.g. Internet) does not need be handed over at the same time. This may mean e.g. that the old MC-U proving V2X service to the mobile UE is changed to a new MC-U, whereas the MC-U providing Internet service is not. Also, the MC-C providing control plane connectivity need not be changed, as long as the MC-C is controlling also the new MC-U.

Further, there may be a 1-to-many relationship between MC-C and MC-Us for service provisioning to a single terminal with single- or multi-connectivity. Thereby, the architecture can be simplified, as multiple MC-Us (possibly relating to same or different services or service flows) can be controlled by the same MC-C (not relating to any specific service or service flow, but being service-independent). Also, the architecture can be made more flexible, as MC-C can serve a larger area then the individual MC-Us, and its deployment can be adjusted, as needed or preferred (e.g. in view of the services or service flows to be controlled).

As shown in FIG. 5, a MC-U can be implemented by a dedicated entity having a UP interface connection with a user plane gateway, i.e. uGW 1 in the present example, or in a UP gateway, i.e. uGW 2 in the present example, wherein in any case the UP gateway is configured to provide a UP gateway to a core network of the communication system. For example, the MC-U can be implemented as a dedicated MC-U entity when then related uGW represents a global gateway, and the MC-U can be implemented as/in/with the uGW as such when it represents a local gateway. In those cases where the uGW and MC-U are collocated or hosted in the same node or entity, a distinction between the RAN and core network functionalities of/in such node or entity may be ensured.

By way of the CP and UP decoupling by a separation into distinct/dedicated apparatuses or logical entities in the radio access network and an interface there-between, as illustrated in FIG. 5, the following observations can be made with regard to RAN (or AS) mobility in the radio access network.

Any change in the MC-U of a specific service (e.g. either service flow 1 or service flow 2) due to UE mobility, i.e. a terminal handover to an AP being served by another MC-U in terms of said specific service (e.g. handling of either service flow 1 or service flow 2), will not mean change of MC-C or MC-U relating to another service or service flow. Accordingly, no reconfiguration is required for any other service or service flow.

This can relieve challenges to the dimensioning topology of multicontrollers (aggregation nodes), since the aggregation will be defined by the smaller one of the individual CP and UP units/parts.

RAN mobility is abstracted from the CN, and the CN is involved only when the combination of MC-C/MC-U undergoes mobility.

Figure 6:
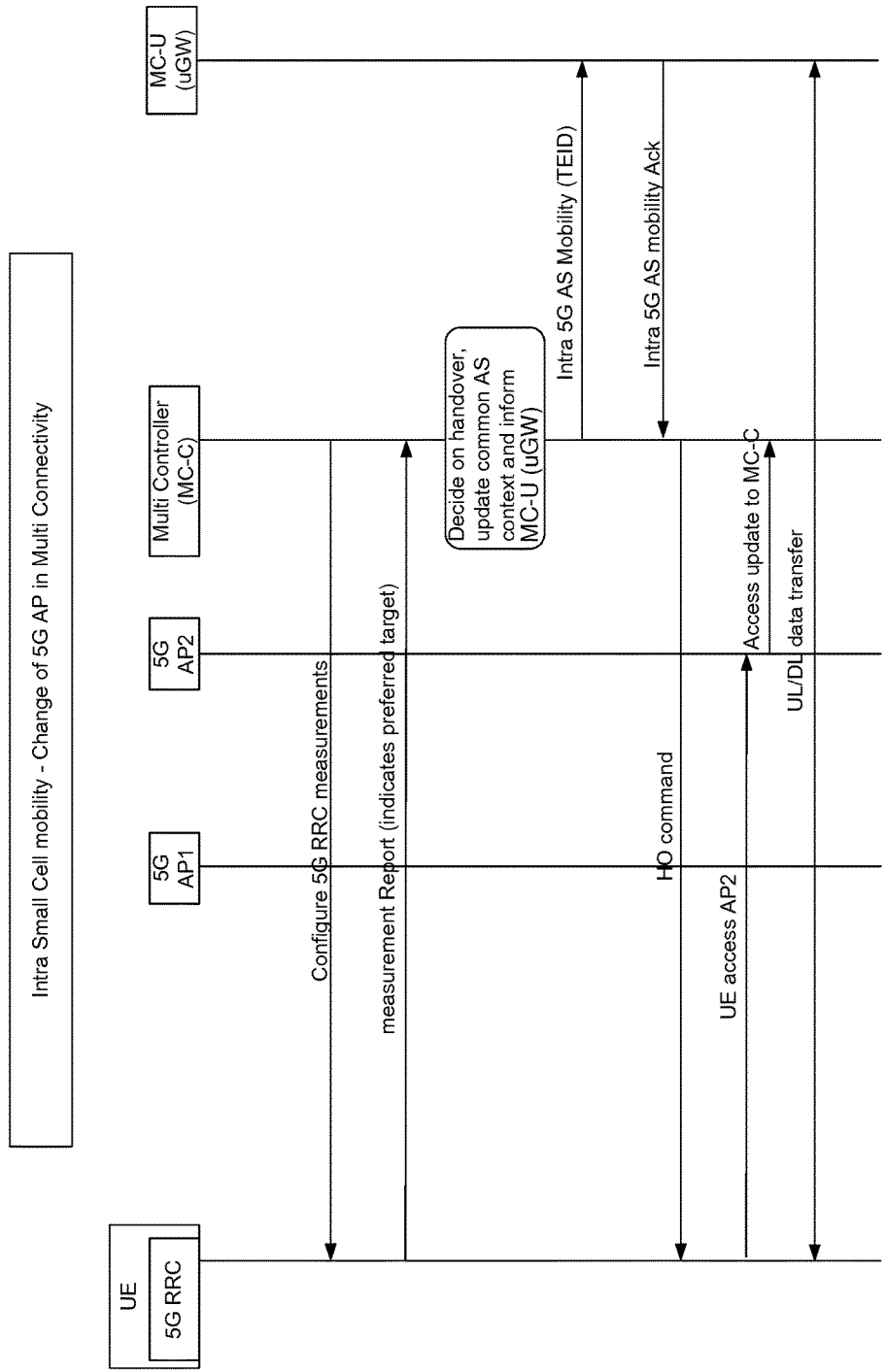
FIG. 6 shows a signaling diagram of an example of a procedure of intra small cell mobility in a 5G communication system architecture according to exemplifying embodiments of the present invention.

FIG. 6 shows a signaling diagram of an example of a procedure of intra small cell mobility in a 5G communication system architecture according to exemplifying embodiments of the present invention. In the underlying architecture, it is assumed that the relevant MC-U is implemented by a uGW.

In the scenario of FIG. 6, it is assumed that the UE currently access 5G AP1, i.e. has a 5G RRC connection to 5G AP1. When 5G RRC measurements are configured (and initiated) by the MC-C (terminating the CP/RRC connection from 5G AP1), and the measurement report from the UE indicates a preferred handover (and a preferred handover target), the MC-C decides on the handover, updates the common AS context and informs the MC-U/uGW (terminating the UP/NCS connection from 5G AP1 (and capable of terminating a UP/NCS connection from 5G AP2)) accordingly. It is to be noted that, depending on the implementation of the MC-U alone or together with a uGW, as described above, the MC-U as such or the uGW involving the MC-U is informed at this point. Then, the MC-C and the MC-U coordinate the 5G AS mobility event over their CP interface connection. Thereupon, the MC-C issues a handover (HO) command to the UE, the UE accesses the target 5G AP2 (wherein, for such access of 5G AP2, no RRC connection setup is required, as 5G AP2 is controlled by the same MC-C still terminating the same RRC connection as before for access of 5G AP1) and the 5G AP2 reports an access update to the MC-C. Then, upon completion of the handover, UL/DL data transfer between the UE and the MC-U is possible via the 5G AP2.

In the following, an exemplary use case of RAN (or AS) mobility in the radio access network is discussed by way of a comparison between CP/UP decoupling according to exemplifying embodiments of the present invention and conventional CP/UP collocation.

Figure 7:
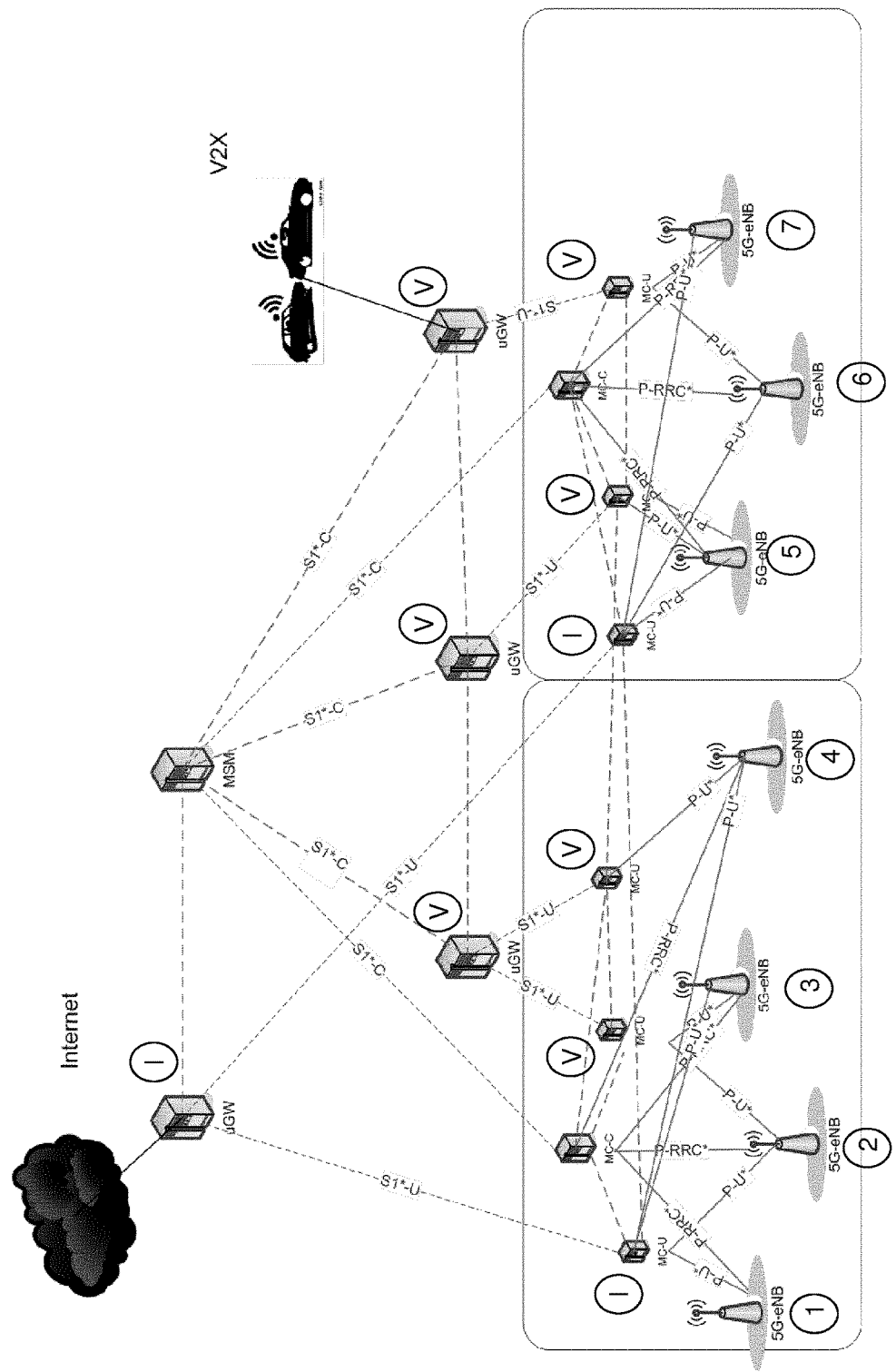
FIG. 7 shows a schematic diagram illustrating an exemplary use case in a 5G communication system architecture with CP/UP decoupling in the RAN according to exemplifying embodiments of the present invention.

FIG. 7 shows a schematic diagram illustrating an exemplary use case in a 5G communication system architecture with CP/UP decoupling in the RAN according to exemplifying embodiments of the present invention. In the underlying architecture, the MC-Cs and MC-Us represent aggregation nodes for CP and UP connections/issues, respectively.

Figure 8:
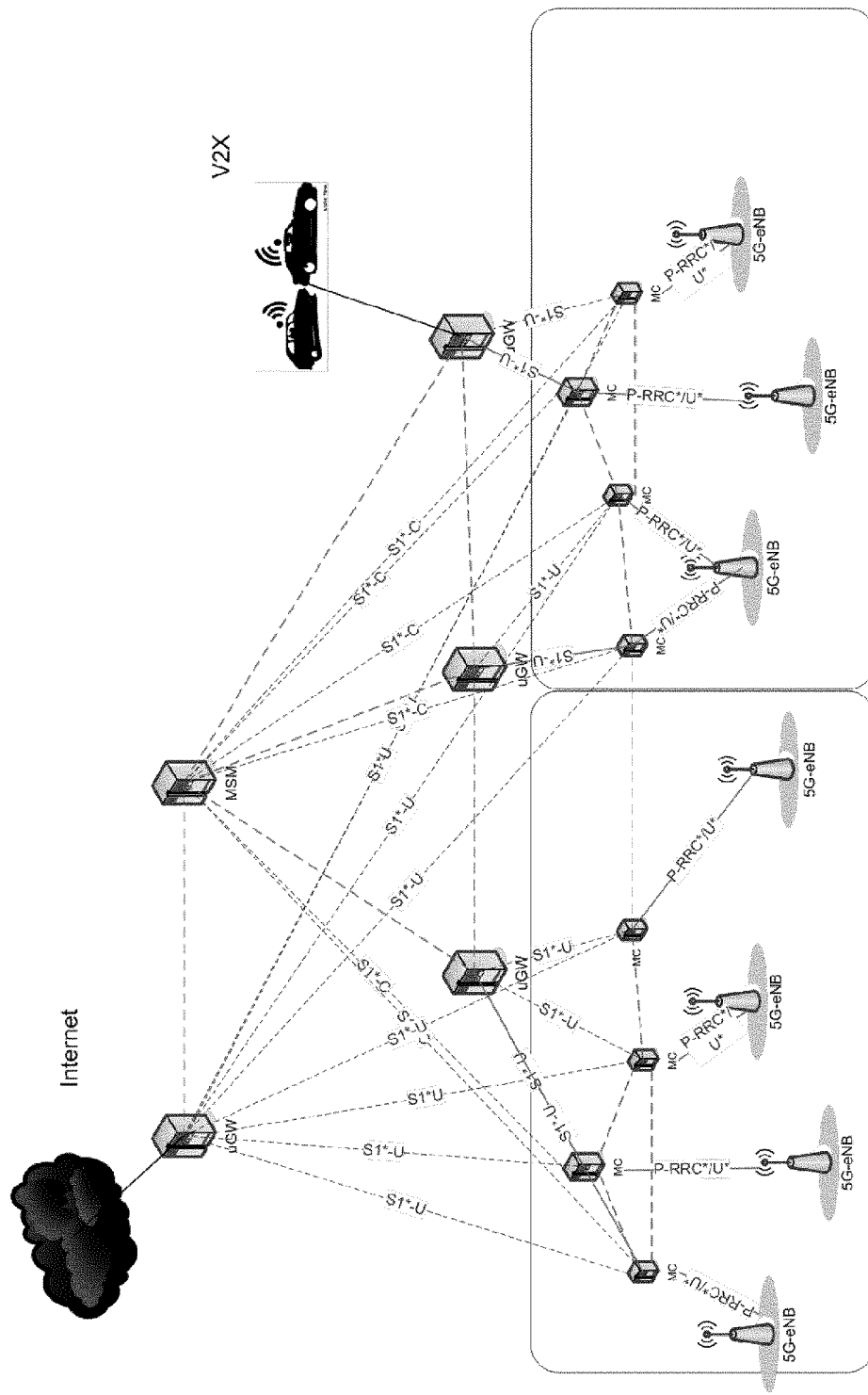
FIG. 8 shows a schematic diagram illustrating, as a comparative example, an exemplary use case in a 5G communication system architecture with conventional CP/UP collocation in the RAN.

FIG. 8 shows a schematic diagram illustrating, as a comparative example, an exemplary use case in a 5G communication system architecture with conventional CP/UP collocation in the RAN. Similar to the architecture of FIG. 7, the MCs represent aggregation nodes for CP and UP connections/issues, yet being hosted always together.

For the following, it is noted that the mapping between individual entities, especially between 5G eNBs and MCs, is a mere non-limiting example for illustrative purposes only. For the sake of lucidity, a one-to-one mapping between 5G eNBs and MCs is mostly assumed in FIG. 8, while multiple 5G eNBs could generally be served by a single MC, for example.

For the exemplary use case, it is assumed that two services are provided, namely Internet and V2X, which are offered by different uGWs. Namely, the Internet service is provided by a single global Internet gateway (uGW) connected to the Internet symbol, the V2X service is provided by multiple local V2X gateways (uGWs) connected to the V2X symbol. In FIG. 7, for the sake of lucidity, all uGWs and MC-Us providing/handling the Internet service are marked with (I), while all uGWs and MC-Us providing/handling the V2X service are marked with (V).

The square boxes in FIG. 7 denote the area served by a single MC-C, while corresponding square boxes are also depicted in FIG. 8 for the purpose of enabling a comparison between the different scenarios. Accordingly, it is illustrated that each MC-C according to exemplifying embodiments of the present invention is able to provide CP coverage over an area comprising plural UP apparatuses (MC-U) and/or access points (5G eNB), each of which is connected to the MC-C for CP connectivity.

As is evident from any one of FIGS. 7 and 8, coverage of the Internet uGW is bigger in terms of geographical area than that of the individual V2X uGWs, and the individual V2X uGWs serve a smaller area (closer to the transport and radio network). This may also be due to the varying latency requirements of the services offered by respective gateways, i.e. the coverage can be adjusted to certain operational requirements. Hence, service provisioning of the V2X service needs more frequent handovers in case of RAN mobility.

As an example of RAN mobility, it is assumed that the UE moves from the left-hand side to the right-hand side, thereby performing successive handovers between respectively adjacent 5G eNBs (representing 5G APs) from left to right, i.e. a total of 6 AP handovers. In FIGS. 7 and 8, for the sake of lucidity, the 5G eNBs are numbered form left to right.

In such case, the mobility events to be observed are as follows.

In the architecture of FIG. 7, i.e. with CP/UP decoupling in the RAN according to exemplifying embodiments of the present invention, when a UE moves from the leftmost 5G eNB to the rightmost 5G eNB, it undergoes the following mobility events:

1 handover of MC-C (1 reconfiguration of RRC connection), when moving from 5G eNB #4 to 5G eNB #5 (since these are served by different MC-Cs).

1 handover of MC-U offering Internet service, when moving from 5G eNB #4 to 5G eNB #5 (since these are served by different MC-Us providing/handling Internet service).

3 handovers of MC-U offering V2X service, when moving from 5G eNB #3 to 5G eNB #4, from 5G eNB #4 to 5G eNB #5, and from 5G eNB #5 to 5G eNB #6 (since these pairs are served by different MC-Us providing/handling V2X service, respectively).

It has to be noted that, when the V2X MC-Us are undergoing 3 handovers, they are not impacting either the CP aggregation entities, i.e. the MC-Cs, or the MC-Us handling Internet service. For example, RRC connections do not need to be re-established and UE context transfers are not required, but just a 5G eNB address (TEID) update is needed, so that such handovers can be handled in a very fast and efficient manner.

Hence, when the UE leaves coverage of one service, only that service is impacted (i.e. UP handling thereof).

In the architecture of FIG. 8, i.e. with conventional CP/UP collocation in the RAN, when a UE moves from the leftmost 5G eNB to the rightmost 5G eNB, it undergoes the following mobility events:

6 handovers of MC, when moving between any pair of adjacent 5G eNBs (since all of the 5G eNBs are served by different MCs, respectively).

It has to be noted that, irrespective of whether there is a need or not, all of the services as well as CP undergoes handover in case of any AP handover. This is because the coverage of the MC (CP and UP included) is always limited to the smallest service are (i.e. the V2X gateways in the present example).

Hence, when the UE leaves coverage of one service, all services as well as control signaling are impacted (i.e. UP and CP handling of all services).

As evident form the above, the total number of handovers is reduced by way of CP/UP decoupling in the RAN according to exemplifying embodiments of the present invention. More specifically, the number of CP handovers (requiring most operations) can be significantly reduced, while the number of UP handovers can also be reduced.

With reference to FIGS. 6 and 7, as described above, it can be seen that any CP entity (e.g. MC-C) is configured to handle CP mobility of a terminal within the radio access network, when a terminal handover is performed between an access point being subject to CP functionality provided by said CP entity (e.g. MC-C) and an access point being subject to CP functionality provided by another CP entity (e.g. MC-C), and/or to control, via the CP connection to a UP entity (e.g. MC-U), handling of UP configuration and/or UP mobility of the terminal within the radio access network at the UP entity (e.g. MC-U), when a terminal handover is performed between access points both being subject to CP functionality provided by said CP entity (e.g. MC-C). Also, it can be seen that any UP entity (e.g. MC-U) is configured to be controlled by an associated CP entity (e.g. MC-C) in terms of UP configuration and/or UP mobility of the terminal within the radio access network, when a terminal handover is performed between an access point being subject to UP functionality provided by said UP entity (e.g. MC-U) and an access point being subject to UP functionality provided by another UP entity (e.g. MC-U).

By virtue of exemplifying embodiments of the present invention, as evident from the above, decoupling of the control plane and the user plane in a radio access network can be enabled/realized, while providing service-specific mobility (i.e. enabling the handling of mobility based on a service being offered/provided by a connection subject to mobility). Thereby, RAN (or AS) mobility in the radio access network can be optimized, especially in a communication system enabling multi-connectivity.

More specifically, the CP functionality and the UP functionality can be decoupled by a separation into distinct/dedicated apparatuses or logical entities in the radio access network and an interface there-between. Also, the CP and UP entities can be configured to aggregate one or more CP and UP connections for single- or multi-connectivity of one or more terminals, e.g. by being implemented by an aggregation node for multi-connectivity anchoring and management in the CP and UP for plural access points, respectively. Thereby, it can be achieved to facilitate independent or service-specific mobility of CP and UP (or, CP and UP entities) and reduce involved overhead, and/or to abstract RAN mobility from the CN, and/or to limit AS mobility signaling to RAN, and/or to reduce signaling by simplifying the underlying architecture.

As the CP entity and the UP entity can be employed to establish and provide independent mobility for the control and user planes based on user-subscribed services, reconfigurations and signaling overhead can be limited. Also, a different treatment of different services or service flows is enabled, and thus traffic steering can be improved, especially in diverse environments (with multiple layers of nodes with different possible connection parameters) and/or mobile users/terminals.

During an intra-RAT mobility handover, it could be observed that involvement of cMGW in RAN mobility can be avoided, and signaling can be reduced, since there is no communication to cMGW, and/or UP handling can be aggregated at any UP entity (e.g. MC-U) and can be decoupled from the CP entity (e.g. MC-C), and/or there could be use cases where multiple UP entities (e.g. MC-Us or local uGWs) can be handled by the same CP entity (e.g. MC-C), wherein in such use cases the mobility signaling and re-configuration can be limited to the UP entity (e.g. MC-U or local uGW) associated with the particular service or service flow and does not involve UP entities (e.g. MC-Us or local GWs) of other services or service flows, and/or the RAN/AS mobility could be limited to the RAN/AS only such that it is invisible/transparent to upper levels such as the CN as well as lower levels such as AP/eNB/ etc. and users/terminals, and/or faster mobility, less service disruption and earlier start of data transfer can be accomplished.

Corresponding savings resulting from the above-outlined effects are mainly effective at/for RAN and CN (e.g. reduction of overhead and signaling), but partly also at/for UEs. In particular, resulting latency savings and reductions in service disruption are effective for all parts of the communication system, including RAN, CN and UEs.

Hence, the issues and/or problems and drawbacks, as described with the related art in the above background section, can be addressed, respectively.

The above-described structures, configurations, schemes, methods, procedures and functions may be implemented by respective functional elements, entities, modules, units, processors, or the like, as described below.

While in the foregoing exemplifying embodiments of the present invention are described mainly with reference to procedures and functions, corresponding exemplifying embodiments of the present invention also cover respective apparatuses, entities, modules, units, network nodes and/or systems, including both software and/or hardware thereof.

Respective exemplifying embodiments of the present invention are described below referring to FIGS. 9 and 10, while for the sake of brevity reference is made to the detailed description of respective corresponding structures, configurations, schemes, methods, procedures and functions according to FIGS. 3 to 7.

Figure 9:
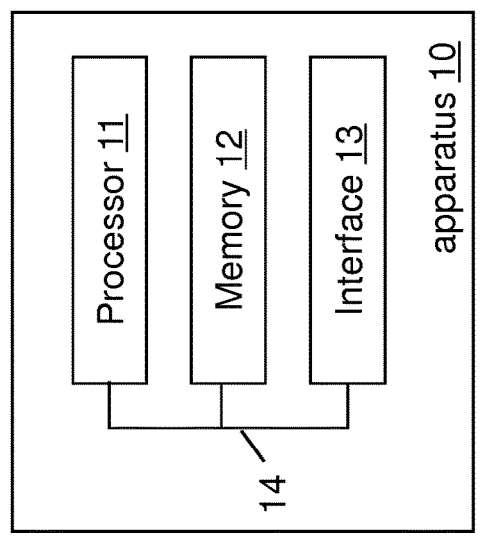
FIG. 9 shows a schematic diagram illustrating an example of a structure of apparatuses according to exemplifying embodiments of the present invention.
Figure 10:
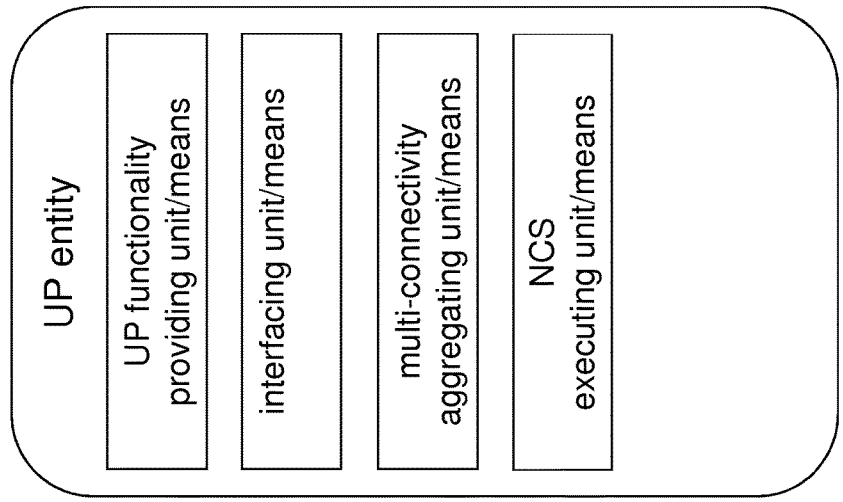
FIG. 10 shows a schematic diagram illustrating another example of a structure of apparatuses according to exemplifying embodiments of the present invention.
Figure 10:
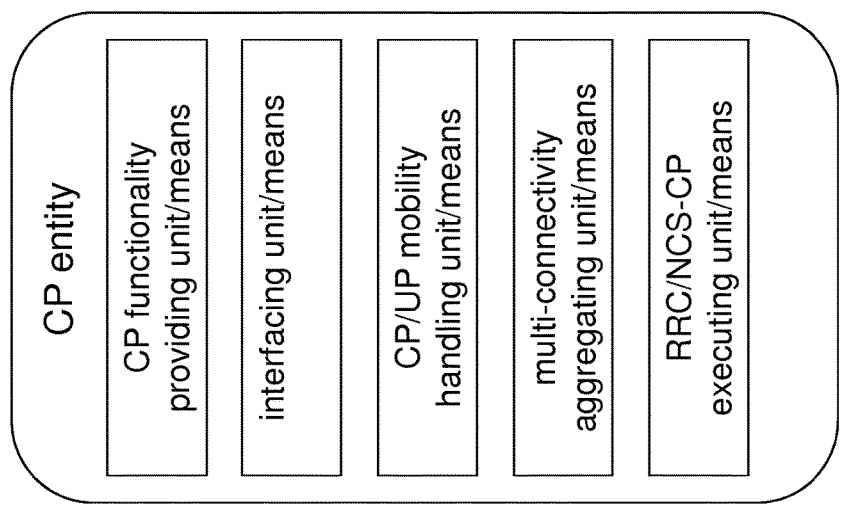

In FIGS. 9 and 10, the blocks are basically configured to perform respective schemes, methods, procedures and functions as described above. The blocks are basically configured to perform the schemes, methods, procedures and functions as described above, respectively. With respect to FIGS. 9 and 10, it is to be noted that the individual blocks are meant to illustrate corresponding functional blocks, respectively. Such functional blocks are implementation-independent, i.e. may be implemented by means of any kind of hardware or software or combination thereof, respectively.

Further, in FIGS. 9 and 10, only those functional blocks are illustrated, which relate to any one of the above-described schemes, methods, procedures and functions. A skilled person will acknowledge the presence of any other conventional functional blocks required for an operation of respective structural arrangements, such as e.g. a power supply, a central processing unit, respective memories or the like. Among others, one or more memories are provided for storing programs or program instructions for controlling or enabling the individual functional entities or any combination thereof to operate as described herein in relation to exemplifying embodiments.

FIG. 9 shows a schematic diagram illustrating an example of a structure of apparatuses according to exemplifying embodiments of the present invention.

As indicated in FIG. 9, according to exemplifying embodiments of the present invention, any apparatus 10 may comprise at least one processor 11 and at least one interface 13 (and possibly also at least one memory 12), which may be operationally connected or coupled, for example by a bus 14 or the like, respectively.

The processor 11 and/or the interface 13 of the apparatus 10 may also include a modem or the like to facilitate communication over a (hardwire or wireless) link, respectively. The interface 13 of the apparatus 10 may include a suitable transmitter, receiver or transceiver connected or coupled to one or more antennas, antenna units, such as antenna arrays or communication facilities or means for (hardwire or wireless) communications with the linked, coupled or connected device(s), respectively. The interface 13 of the apparatus 10 is generally configured to communicate with at least one other apparatus, device, node or entity (in particular, the interface thereof).

The memory 12 of the apparatus 10 may represent a (non-transitory/tangible) storage medium and store respective software, programs, program products, macros or applets, etc. or parts of them, which may be assumed to comprise program instructions or computer program code that, when executed by the respective processor, enables the respective electronic device or apparatus to operate in accordance with the exemplifying embodiments of the present invention. Further, the memory 12 of the apparatus 10 may (comprise a database to) store any data, information, or the like, which is used in the operation of the apparatus.

In general terms, respective apparatuses (and/or parts thereof) may represent means for performing respective operations and/or exhibiting respective functionalities, and/or the respective devices (and/or parts thereof) may have functions for performing respective operations and/or exhibiting respective functionalities.

In view of the above, the thus illustrated apparatus 10 is suitable for use in practicing one or more of the exemplifying embodiments of the present invention, as described herein.

When in the subsequent description it is stated that the processor (or some other means) is configured to perform some function, this is to be construed to be equivalent to a description stating that a (i.e. at least one) processor or corresponding circuitry, potentially in cooperation with a computer program code stored in the memory of the respective apparatus or otherwise available (it should be appreciated that the memory may also be an external memory or provided/realized by a cloud service or the like), is configured to cause the apparatus to perform at least the thus mentioned function.

According to exemplifying embodiments of the present invention, the thus illustrated apparatus 10 may represent or realize/embody a (part of a) CP apparatus or entity, such as e.g. a MC-C. Specifically, the thus illustrated apparatus 10 may be configured to perform a procedure and/or exhibit a functionality and/or implement a mechanism, as described, in any one of FIGS. 3 to 7 for a CP entity or MC-C. In the above-outlined embodiments, the CP apparatus is a separate entity from the access point.

Accordingly, the apparatus 10 may be caused or the apparatus 10 or its at least one processor 11 and/or interface 13 (possibly together with computer program code stored in the at least one memory 12), in its most basic form, is configured to cause the apparatus to perform at least the following, i.e. to provide control plane functionality in the radio access network for controlling control plane (single- or multi-)connectivity of at least one terminal to a core network of the communication system via the radio access network, and to establish a control plane connection to at least one user plane apparatus, each user plane apparatus being configured to provide user plane functionality in the radio access network for realizing user plane (single- or multi-) connectivity of the at least one terminal to the core network of the communication system via the radio access network.

According to exemplifying embodiments of the present invention, the thus illustrated apparatus 10 may represent or realize/embody a (part of a) UP apparatus or entity, such as e.g. a MC-U. Specifically, the thus illustrated apparatus 10 may be configured to perform a procedure and/or exhibit a functionality and/or implement a mechanism, as described, in any one of FIGS. 3 to 7 for a UP entity or MC-U. In the above-outlined embodiment, the UP apparatus is a separate entity from the access point.

Accordingly, the apparatus 10 may be caused or the apparatus 10 or its at least one processor 11 and/or interface 13 (possibly together with computer program code stored in the at least one memory 12), in its most basic form, is configured to cause the apparatus to perform at least the following, i.e. to provide user plane functionality in the radio access network for realizing user plane (single- or multi-) connectivity of at least one terminal to the core network of the communication system via the radio access network, and to provide a control plane connection to at least one control plane apparatus, each control plane apparatus being configured to provide control plane functionality in the radio access network for controlling control plane (single- or multi-)connectivity of the at least one terminal to the core network of the communication system via the radio access network.

As mentioned above, any apparatus according to exemplifying embodiments of the present invention may be structured by comprising respective units or means for performing corresponding operations, procedures and/or functions. For example, such units or means may be implemented/realized on the basis of an apparatus structure, as exemplified in FIG. 9, i.e. by one or more processors 11, one or more memories 12, one or more interfaces 13, or any combination thereof.

FIG. 10 shows a schematic diagram illustrating another example of a structure of apparatuses according to exemplifying embodiments of the present invention.

As shown in FIG. 10, an apparatus representing a CP entity according to exemplifying embodiments of the present invention may comprise (at least) a CP functionality providing means/unit for providing control plane functionality in the radio access network, such as e.g. a processor, and an interfacing means/unit for establishing a control plane interface connection to a user plane apparatus, such as e.g. an interface. Such apparatus may further comprise (one or more of) a CP/UP mobility handling unit/means for handling control plane and user plane mobility of the terminal within the radio access network (i.e. locally controlling control plane mobility and/or remotely controlling user plane configuration and/or user plane mobility at an associated UP entity), a multi-connectivity aggregating unit/means for aggregating one or more control plane connections for single- or multi-connectivity of plural terminals, and a RRC/NCS-CP executing unit/means for executing one or more network-side functions of radio resource control and/or network convergence sub-layer functions on the control plane for the terminal. Still further, the interfacing unit/means may be capable of establishing at least one of a control plane interface connection to at least one access point configured to provide an access to the radio access network and a control plane interface connection to at least one control plane gateway configured to provide a control plane gateway to a core network of the communication system.

As shown in FIG. 10, an apparatus representing a UP entity according to exemplifying embodiments of the present invention may comprise (at least) a UP functionality providing means/unit for providing user plane functionality in the radio access network, such as e.g. a processor, and an interfacing means/unit for providing a control plane interface connection to a control plane apparatus, such as e.g. an interface. Such apparatus may further comprise (one or more of) a multi-connectivity aggregating unit/means for aggregating one or more user plane connections for single- or multi-connectivity of plural terminals, and a NCS executing unit/means for executing one or more network-side functions of network convergence sub-layer functions for the terminal. Still further, the interfacing unit/means may be capable of establishing at least one of a control plane interface connection to at least one control plane gateway to a core network of the communication system and a user plane interface connection to at least one access point configured to provide an access to the radio access network.

For further details regarding the operability/functionality of the individual apparatuses (or units/means thereof) according to exemplifying embodiments of the present invention, reference is made to the above description in connection with any one of FIGS. 3 to 7, respectively.

According to exemplifying embodiments of the present invention, any one of the processor, the memory and the interface, as well as any one of the units/means, may be implemented as individual modules, chips, chipsets, circuitries or the like, or one or more of them can be implemented as a common module, chip, chipset, circuitry or the like, respectively.

According to exemplifying embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or units/means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for enabling/realizing decoupling of the control plane and the user plane in a radio access network. Such measures exemplarily comprise respective entities which are operable in a radio access network of a communication system and their respective operations, wherein a control/user plane entity provides control/user plane functionality in the radio access network for controlling single- or multi-connectivity of at least one terminal to the core network of the communication system via the radio access network, and establish/provide a control/user plane interface to at least one user/control plane apparatus configured to provide user/control plane functionality in the radio access network for realizing single- or multi-connectivity of the at least one terminal to the core network of the communication system via the radio access network.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP Third Generation Partnership Project
AAA Authentication, Authorization and Accounting
AP Access Point
AS Access Stratum
ASIx Application Service Instance/Interface x
cMGW control plane Mobile Gateway
CN Core Network
CP Control Plane
uSE control plane Service Edge
DL Downlink
eNB enhanced Node B (LTE/LTE-A base station)
ETH Ethernet
GPRS General Packet Radio Service
GRE Generic Routing Encapsulation
GTP GPRS Tunneling Protocol
GW Gateway
HO Handover
HSS Home Subscriber Server
IP Internet Protocol
LTE Long Term Evolution
LTE-A Long Term Evolution Advanced
MAC Medium Access Control
MC Multicontroller
MME Mobility Management Entity
NAS Non-Access Stratum
NCS Network Convergence Sub-layer
NT Network Termination
PDCP Packet Data Convergence Protocol
PHY Physical Layer
QoS Quality-of-Service
RAN Radio Access Network
RAT Radio Access Technology
RCS Radio Convergence Sub-layer
RNC Radio Network Controller
RRC Radio Resource Control
uGW user plane Gateway
UP User Plane
UE User Equipment
UL Uplink
UMTS Universal Mobile Telecommunications System
UNI User Network Interface
uSE user plane Service Edge
V2X Vehicle-to-X (or, Vehicle-to-Any)
WLAN Wireless Local Area Network

The invention claimed is:

1. An apparatus operable in a radio access network of a communication system, comprising an interface; and
   at least one processor and at least one memory including a computer program code, wherein the at least one memory and the computer program code are configured, with the at least one processor, to cause the apparatus to perform at least the following:
   provide control plane functionality in the radio access network for controlling control plane connectivity of at least one terminal to a core network of the communication system via the radio access network, and
   establish, via the interface, a control plane connection to at least one user plane apparatus operable in the radio access network, each user plane apparatus being configured to provide user plane functionality in the radio access network for realizing user plane connectivity of the at least one terminal to the core network of the communication system via the radio access network, and perform the following for a specific service being provided by the user plane apparatus:

handle control plane mobility of the at least one terminal within the radio access network, when a terminal handover is performed between an access point being subject to the control plane functionality provided by said apparatus and an access point being subject to control plane functionality provided by another apparatus configured to provide control plane functionality in the radio access network, and control, via the control plane connection, handling of user plane configuration or user plane mobility of the terminal within the radio access network at the user plane apparatus, when a terminal handover is performed between access points that is subject to the control plane functionality provided by said apparatus.

2. The apparatus according to claim 1, wherein the at least one memory and the computer program code are configured, with the at least one processor, to cause the apparatus further to perform at least one of the following:

manage terminal mobility in a service-specific manner, or manage terminal mobility in the user plane independently from terminal mobility in the control plane.

3. The apparatus according to claim 1, wherein the at least one memory and the computer program code are configured, with the at least one processor, to cause the apparatus further to:

aggregate one or more control plane connections for multi-connectivity of the at least one terminal, which is established via at least two access points of the communication system, wherein the multi-connectivity via the at least two access points comprises at least one of:

one or more control plane connections and multiple user plane connections over different radio interfaces of the same radio access technology or system specification, and one or more control plane connections and multiple user plane connections over different radio access technologies or system specifications.

4. The apparatus according to claim 1, wherein the at least one memory and the computer program code are configured, with the at least one processor, to cause the apparatus further to:

manage the control plane connectivity towards the core network with respect to a plurality of access points.

5. The apparatus according to claim 1, wherein the at least one memory and the computer program code are configured, with the at least one processor, to cause the apparatus further to perform at least one of the following:

establish a first control plane signaling connection to at least one terminal through at least one access point configured to provide the at least one terminal with an access to the radio access network and a second control plane signaling connection to at least one control plane handling entity configured to provide a control plane handling functionality to the core network of the communication system, or provide control plane coverage over an area comprising plural user plane apparatuses or access points, each of which is connected to the apparatus for the control plane connectivity.

6. The apparatus according to claim 1, wherein the user plane apparatus is comprised in a dedicated entity having a user plane connection with a user plane handling entity or in a user plane handling entity, wherein the user plane handling entity is configured to provide a user plane handling functionality to the core network of the communication system.

7. A method operable in a radio access network of a communication system, comprising:

providing control plane functionality in the radio access network for controlling control plane connectivity of at least one terminal to a core network of the communication system via the radio access network, and establishing a control plane connection to at least one user plane apparatus operable in the radio access network, each user plane apparatus being configured to provide user plane functionality in the radio access network for realizing user plane connectivity of the at least one terminal to the core network of the communication system via the radio access network, and performing at least one of the following for a specific service being provided by the user plan apparatus:

handling control plane mobility of the at least one terminal within the radio access network, when a terminal handover is performed between an access point being subject to the control plane functionality provided by said apparatus and an access point being subject to control plane functionality provided by another apparatus configured to provide control plane functionality in the radio access network, and controlling, via the control plane connection, handling of user plane configuration and/or user plane mobility of the terminal within the radio access network at the user plane apparatus, when a terminal handover is performed between access points both being subject to the control plane functionality provided by said apparatus.

8. The method according to claim 7, further comprising performing at least one of the following:

managing terminal mobility in a service-specific manner, or managing terminal mobility in the user plane independently from terminal mobility in the control plane.

9. The method according to claim 7, further comprising:

managing the control plane connectivity towards the core network with respect to a plurality of access points.

10. The method according to claim 7, further comprising performing at least one of the following:

establishing a first control plane signaling connection to at least one terminal through at least one access point configured to provide the at least one terminal with an access to the radio access network and a second control plane signaling connection to at least one control plane handling entity configured to provide a control plane handling functionality to the core network of the communication system, or providing control plane coverage over an area comprising plural user plane apparatuses or access points, each of which is connected to the apparatus for the control plane connectivity.

* * * * *